United States Patent Office 3,822,325
Patented July 2, 1974

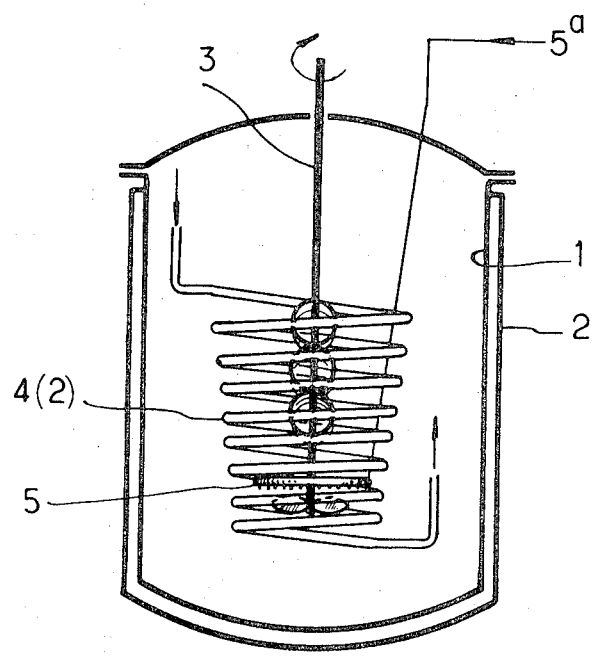

3,822,325
PREPARATION OF COPOLYMERIZABLE UNSATURATED POLYESTER RESINS
Henri Blaise, Chauny, Bernard Carre, St. Auban, Jacques Meyer, Paris, Marc Prablanc, Chauny, and Philippe Thomas, Boulogne-sur-Seine, France, assignors to Produits Chimiques Pechiney-Saint-Gobain, Neuilly-sur-Seine, France
Filed Oct. 7, 1971, Ser. No. 187,291
Claims priority, application France, Oct. 12, 1970, 7036739
Int. Cl. C08g 17/10, 17/12
U.S. Cl. 260—861    16 Claims

ABSTRACT OF THE DISCLOSURE

This invention relates to a process and apparatus for the preparation, without the use of a catalyst, of practically colorless copolymerizable unsaturated polyester resins from an alkylene oxide.

BACKGROUND OF THE INVENTION

It is known that polyester resins may be prepared by carrying out a polyaddition reaction between an alkylene oxide and a mixture of anhydrides of dicarboxylic acids, one at least of which contains an ethylenically unsaturated group, in the presence of a chain limiter and a catalyst, at a temperature below 150° C., then effecting the isomerization of the cis-maleic form into trans-fumaric form at a higher temperature (about 200° C. in the particular case of maleic anhydride) and finally dissolving the polyester obtained in a copolymerizable vinyl group-containing monomer. The polyester resin obtained by this known process is, however, highly colored and its preparation takes rather a long time.

To reduce the coloration, it has been proposed that the polyaddition reaction be carried out in the presence of specific catalysts and that phosphoric acid be added to the polyester. It has also been proposed that the reaction be carried out without a catalyst present, but then the reaction is even slower, a fact that is especially favorable to homopolymerization of alkylene oxide.

Although the proposals of the immediately preceding paragraph lead to a reduction of the coloring effect, the latter still remains too strong for many applications of the resulting polyester resins. Moreover, since the time necessary for their preparation is long, the industrial value of such processes is correspondingly reduced.

It is an object of the present invention to provide a process which, by comparison with known processes, permits the preparation within shorter times, of practically colorless copolymerizable polyester resins based on alkylene oxide.

SUMMARY OF THE INVENTION

According to the present invention, a process for the preparation of copolymerizable unsaturated polyester resins from an alkylene oxide, comprises vigorously agitating a mixture of an unsaturated dicarboxylic acid anhydride and a chain limiter in an oxygen free atmosphere and maintained at a temperature within the range of 130° C. to 220° C., continuously introducing an alkylene oxide into the most turbulent zone of the mixture and mixing the polyester produced with a copolymerizable vinyl group-containing monomer in the presence of a polymerization inhibitor.

The unsaturated dicarboxylic acid anhydrides, which may be used, include itaconic anhydride, citraconic anhydride and, more particularly, maleic anhydride.

The mixture may include saturated dicarboxylic acid anhydrides, halogenated or unhalogenated, for example succinic anhydride, tetrahydrophthalic anhydride, tetrachlorophthalic anhydride, tetrabromophthalic anhydride and, more particularly, phthalic anhydride. The quantity used ranges up to 80 mole percent with respect to the total quantity of anhydride present in the mixture.

The chain limiter may be constituted by water; a mono-alcohol such as methanol, ethanol, propanol or butanol; a diol such as ethylene-glycol, propylene-glycol, 1,4-butane-diol, diethylene-glycol or dipropylene-glycol; a triol such as glycerol or trimethylolpropane; a tetrol such as pentaerythritol; a monoacid such as acetic acid, propionic acid or butyric acid; a diacid such as maleic acid, adipic acid, sebacic acid or fumaric acid; or a triacd such as trimellic acid.

This chain limiter is added in proportions ranging from 5 to 30 mole percent, and preferably from 10 to 20 mole percent, relative to the anhydride. The larger the molecular mass desired, the smaller of course will be the quantity of chain limiter.

Alkylene oxides which may be used include ethylene oxide, epichlorohydrin, and particularly propylene oxide.

The alkylene oxide may be used in stoichiometric proportion to the reactive groups of the anhydride/chain limiter mixture, that is 0.5 mole of alkylene oxide per free carboxyl group, but preferably in excess of up to 10%.

The copolymerizable vinyl group-containing monomers used in the preparation of the resin are those generally employed in the polyesters industry. These are especially styrene, chlorostyrene, vinyl toluene, divinyl benzene, alkyl acrylates and methacrylates having less than six carbon atoms, vinyl acetate, vinyl propionate and vinyl pivalate, allyl phthalate, triallyl cyanurate, 1,3-butanediol dimethacrylate and alkyl vinyl ethers.

The proportion of copolymerizable vinyl group-containing monomer used is within the range of 20% to 60% by weight of the polyester resin.

The polymerization inhibitor, which acts to preserve the copolymerizable polyester resin, until required for use, is selected from among conventional inhibitors such as: paratertiarybutyl catechol, hydroquinone monomethyl or monoethyl ether, benzoquinone, hydroquinone 2,5-tertiobutyl, copper naphthenate and more particularly, hydroquinone. It is used in the proportion of 30 to 200 p.p.m. by weight relative to the polyester resin.

In carrying out the process, the anhydride or anhydrides are introduced into a reactor. If the reactor contains oxygen it is removed by placing the reactor under vacuum and/or by passing an inert gas through the reactor under the reaction conditions. The inert gas may be carbon dioxide, nitrogen, argon, helium or a mixture of two or more of these gases. The removal of oxygen and the introduction of the anhydride or anhydrides may be carried out simultaneously. The anhydrides are then heated until they fuse and heating is continued to bring them up to the reaction temperature. The operations of heating and oxygen removal may, with advantage, be carried out simultaneously. The chain limiter is added either before, during or after the fusion of the anhydride, taking account of the fact that, in the case of alcohols, an exothermic reaction occurs.

Advantageously, the anhydride or anhydrides are supplied in liquid form direct from the apparatus used for their manufacture.

When the reaction mixture is at the reaction temperature, the alkylene oxide is introduced, either in a continuous stream or in closely following fractions, into the zone of greatest turbulence, an inert atmosphere being maintained in the reactor. The turbulence zone is produced by agitation which should be such as to cause, simultaneously both dispersion of the alkylene oxide and mixing of the reacting mixture, the viscosity of which increases with the formation of the polyester. If the agitation is not sufficient, that is, if the Reynolds Number by which the turbulence is expressed is less than $1 \times 10^4$, local concentrations of alkylene oxide and polyester will be produced leading to secondary reactions and, in addition, a portion of the alkylene oxide will escape from the reaction mixture without reacting thus resulting in a loss of alkylene oxide. The turbulene produced by the agitation is preferably represented by a Reynolds Number larger than $5 \times 10^4$.

The rate of introduction of the alkylene oxide is a function of the absorption capacity of the reaction mixture. It may remain the same from the start to the finish of the introduction. In such instance, the quantity of alkylene oxide introduced per hour is from 25% to 45% of the total quantity to be introduced. However, since the speed of reaction is high at the start of the introduction of alkylene oxide and then decreases progressively, it is preferable to adopt rates of introduction which vary with time, that is which decrease, either stepwise or linearly. At the start of the introduction, the quantity introduced per hour is from 80% to 100% and at the end of the introduction from 2% to 5% of the total quantity to be introduced. Of course, the two methods of introduction may be combined, for example, a constant introduction rate may be followed by a decreasing introduction rate or, conversely, a decreasing introduction rate may be followed by a constant introduction rate.

Since the reaction between alkylene oxide and anhydride is exothermic, it is necessary to control the temperature by cooling the mixture, if it is desired that the operation shall not be carried out at too high a temperature, that is above 220° C., which would lead to coloring of the polyester. The reaction temperature, which depends upon the reactants used, may be maintained the same for the entire duration of the reaction, or may be made higher at the end of reaction than at the start, to accelerate the reaction when it slows down. Thus, in the case of propylene oxide and maleic anhydride, it is advantageous to effect the operation at 180° to 200° C., if the temperature is the same throughout the duration of the reaction. Polyaddition and isomerization of the maleic anhydride then occur simultaneously. However, it is also possible to start introducing the propylene oxide at 130° C., at which temperature polyaddition is already occurring, and to continue the introduction while raising the temperature up to 200° C. Simultaneous polyaddition and isomerization then occur. This latter procedure has the advantage of enabling polyesters possessing differing isomerization rates to be obtained, depending upon the temperature at which the reaction is terminated.

The reaction time is a function of the reactivity of the reactants used and of the reaction temperature. The lower the temperature, the longer will be the reaction time. It generally lies between 2 hours 30 minutes and 4 hours 30 minutes. It is possible to use reaction times less than 2 hours 30 minutes, but this leads to a risk of causing secondary reactions to occur. Also, if the reaction time is longer than 4 hours 30 minutes, coloring of the product will occur, due to the product being held at a high temperature.

The reaction is carried out under atmospheric pressure, but it is also possible to operate under a pressure slightly above atmospheric, but not exceeding 2 bars absolute.

When the reaction has ended, it is advantageous to remove the very small quantity of alkylene oxide which has not reacted, as by passing a stream of inert gas through the reaction mixture. This flow of inert gas also entrains light secondary products. The total weight of the products entrained represents about 0.5% by weight of the alkylene oxide used. Thus, allowing for the losses occurring during the course of the reaction, for example, unreacted alkylene oxide, a polyester is obtained with a yield of from 96% to 98.5% by weight relative to the alkylene oxide used.

The polyester obtained is then dissolved in the copolymerizable vinyl group-containing monomer, maintained at a temperature within the range of 60° C. to 80° C. The dissolving of the polyester is carried out in the presence of the polymerization inhibitor incorporated in the monomer and/or the polyester.

To the polyester resin obtained, there may be added any of the conventional additives used with polyester resins. Amongst these additives there may be mentioned colorants, pulverulent mineral or organic fillers, and natural or synthetic fibers.

In use, the polyester resins of the invention are copolymerized. Copolymerization is produced by the presence of polymerization initiators, such as, for example, organic peroxides, preferably added immediately prior to the resins being used, in proportions lying between 0.1% and 5% by weight of the polyester resin.

The invention extends to an apparatus for carrying out the process according to the invention. This apparatus comprises a reactor, means for regulating the temperature within the reactor, means for creating an inert atmosphere within the reactor, agitation means, at least part of which is located in the bottom half of the reactor, to produce a turbulent zone, and means for introducing alkylene oxide into the zone of greatest turbulence.

DESCRIPTION OF THE DRAWING

The accompanying drawing shows diagrammatically one form of reactor.

The drawing shows a reactor 1, having a jacket 2 through which a heating or cooling fluid can be circulated. Inside the reactor is an agitation means 3, to produce the turbulence zone, optionally surrounded by a fixed tube 4 through which a heating or cooling fluid can be passed and means for introducing the alkylene oxide through line 5a to at least one injector 5 from which the alkylene oxide issues into the turbulent zone created by the adjacent agitating means. The reactor 1 is also provided with means (not shown) for introducing an inert gas into it or placing it in communication with a vacuum producing means.

The jacket 2 may be replaced by any other conventional temperature regulation system, such as a heat exchanger tube located inside and/or outside the reactor. The tube 4 is not essential but is preferably used as the means for heating or cooling the reaction mixture whether the other temperature regulating means are present or not.

The agitation means, one part at least of which is located in the lower half of the reactor, may be one or more of the following:

an anchor, harrow or frame-type agitator;
a turbine agitator having plane, inclined, curved or arrow-shaped blades;
a conical or biconical agitator;
a helical agitator in which the number, form and inclination of the blades can vary and, in the case where two or more helices are fixed on the same shaft, they may be arranged to have the same pitch or contrary pitch;
a disc-type agitator, plain, perforated or with flat or curved back teeth;
a screw-type agitator;
a ribbon-blender-type agitator;
an electromagnetic agitator; or
a centrifugal pump agitator.

To increase the mixing rate, it is advantageous to associate with the agitation means the tube 4. The tube 4 is preferably arranged co-axially to surround the agitation means and may be cylindrical, frusto-conical or hyperbolic in form. When the reactor has a double envelope internal tube or an internal coiled tube, they are arranged as in the tube 4.

The injector for the introduction of the alkylene oxide is located in the zone of greatest turbulence created by the agitation means and may be any injector giving a good dispersion of a fluid and especially a nozzle, a sintered plate, a perforated tubular ring, or apertures in the agitator head of the agitation system.

The injector is disposed coaxially of the agitation means, or along a generatrix of a cylinder having the agitation means as its base, either above or below the latter.

Since the process is relatively simple, it is easy to operate it continuously, either in a single reactor, or in a series of reactors such as that just described.

The polyester resins prepared by the present process may be used for the manufacture of various laminated articles, plane or undulating plates, buttons, potting compounds, varnishes, and in the paints, textile, paper and construction industries.

DESCRIPTION OF THE PREFERRED EMBODIMENTS

Example 1

A reactor of 5 liters capacity was used having:

a double walled casing for circulation of heating and cooling fluid;

an anchor-type agitator located 10 mm. from the bottom of the reactor and rotating at 360 r.p.m.; and an injection nozzle opening between the blades and the axis of the agitator.

Into this reactor were introduced the following reactants:

588 g. of maleic anhydride
888 g. of phthalic anhydride
111 g. of ethylene-glycol.

Oxygen present in the reactor was scavenged by a flow of nitrogen and these reactants were heated to a temperature of 140° C. 695 g. of propylene oxide was then introduced over a period of three hours. After one hour the mixture was at 200° C., which temperature was maintained until all the propylene oxide had been introduced. A stream of nitrogen was passed through the mixture to remove traces of propylene oxide which had not reacted. There was obtained, with a yield of 97% relative to the propylene oxide, a polyester having a mean molecular mass of 1,300. The polyester was cooled to 150° C. and was poured into 1,140 g. of styrene containing 0.17 g. of hydroquinone maintained at 65° C.

The solution obtained was tested for: color, by means of a Lovibond Tintometer (manufactured by the Tintometer Ltd.—Salisburg, England); viscosity at 25° C., by means of an Epprecht viscometer; and SPI polymerization test carried out at 82° C. with 1% by weight of benzoyl peroxide (A. L. Smith—Section I, Sixth Annual Technical Session Reinforced Plastics Div. S.P.I. 1951).

The following results are obtained:

Color:
  Red _____ 0.3.
  Yellow _____ 5.
  Blue _____ 0.
Viscosity _____ 7 poises.
S.P.I. Test:
  Gel time _____ 3 mins. 5 secs.
  Transformation time _____ 5 minus. 30 secs.
  Maximum temperature _____ 202° C.

By way of comparison, a polyester resin was prepared in accordance with a prior art process. The process was carried out as just described except that 1.5 g. of lithium carbonate was added as catalyst to the anhydrides and to the ethyleneglycol, the whole of the propylene oxide was introduced in one hour while maintaining a mixture temperature of 140° C., and that the temperature was then raised to 200° C. and held there for four hours.

The same tests as previously described gave the following results:

Color:
  Red _____ 9.3.
  Yellow _____ 36.
  Blue _____ 0.
Viscosity _____ 7 poises.
S.P.I. Test:
  Gel time _____ 3 mins, 45 secs.
  Transformation time _____ 6 mins. 25 secs.
  Maximum temperature _____ 210° C.

Examples 2 to 6

Example 1 was repeated, but with variation in the reactants and their proportions. The reaction data and the results obtained are summarized in the following table:

| Examples | 2 | 3 | 4 | 5 | 6 |
|---|---|---|---|---|---|
| Anhydride, g.: | | | | | |
| Maleic | 402 | 392 | 784 | 588 | 706 |
| Phthalic | 875 | 1,184 | 592 | 888 | |
| Tetrahydrophthalic | | | | | 730 |
| Chain limiter, g.: | | | | | |
| Maleic acid | 197.5 | | | | |
| Adipic acid | | 263 | | | |
| Ethylene-glycol | | | | | 111 |
| Glycerine | | | 166 | | |
| Trimethylolpropane | | | | 241 | |
| Propylene oxide, g | 777 | 905 | 696 | 695 | 696 |
| Yield, percent | 96.3 | 97 | 97.2 | 96.8 | 96.2 |
| Molecular mass | 1,300 | 1,290 | 1,340 | 1,310 | 1,340 |
| Styrene, g | 1,126 | 1,372 | 1,169 | 1,206 | 1,121 |
| Hydroquinone, g | 0.29 | 0.33 | 0.28 | 0.29 | 0.27 |
| Color: | | | | | |
| Red | 0.2 | 0 | 0.2 | 0.1 | 0.1 |
| Yellow | 2 | 1.1 | 2 | 1.3 | 1.5 |
| Blue | 0 | 0 | 0 | 0 | 0 |
| Viscosity, poises | 4.5 | 6 | 11 | 5.5 | 4 |
| S.P.I. test: | | | | | |
| Gel time, mins. sec | 4 | 5.10 | 3.40 | 3.20 | 3.30 |
| Total time, mins. sec | 5.50 | 9.30 | 5.20 | 5.30 | 6.30 |
| Max. temperature, ° C | 206 | 166 | 210 | 226 | 220 |

Example 7

In this example an autoclave of 280 mm. diameter and 35 liters effective capacity was used. It had:

a double walled casing for circulation of heating fluid;

a vertical turbine agitator with six straight blades, 15 mm. high and 70 mm. in external diameter, located 100 mm. above the bottom of the autoclave; its rotational speed was 1200 r.p.m. producing a turbulence represented by a Reynolds Number of $1.4 \times 10^5$;

an internal tubular coil for the circulation of cooling fluid, surrounding the agitator, of a generally frusto-conical shape with a height of 170 mm., an upper diameter of 180 mm., a lower diameter of 120 mm. and located 75 mm. above the bottom of the autoclave; and a tube for introducing the alkylene oxide terminated by a nozzle having a diameter of 2 mm., located 10 mm. above the agitator blades and directed along a generatrix of the cylinder having the turbine as its base.

Into the autoclave were introduced:

6456 g. of maleic anhydride,
9750 g. of phthalic anhydride,
1225 g. of ethylene-glycol.

This mixture was heated to 120° C., while a stream of nitrogen was passed through it. When the temperature of the mixture reached 140° C., 7900 g. of propylene oxide were introduced at a flow rate decreasing linearly from 7.3 kg./hour to 0.3 kg./hour for two hours, then constant at the latter rate for one hour. During the introduction, cooling was carried out so that the reaction temperature did not exceed 200° C.

Unreacted propylene oxide was removed by passing nitrogen through the mixture. A polyester having a molecular mass of 1370 was obtained with a yield of 96% relative to the propylene oxide.

The polyester was then dissolved in 12400 g. of styrene containing 3 g. of hydroquinone maintained at 65° C.

The resulting polyester resin when tested gave the following results:

Lovibond Color:
    Red _____ 0.4.
    Yellow _____ 4.
    Blue _____ 0.
Viscosity _____ 6.2 poises.
S.P.I. Test:
    Gel time _____ 4 mins.
    Transformation time _____ 6 mins., 25 sec.
    Maximum temperature _____ 215° C.

Example 8

In this example, the autoclave used was similar to that used in Example 7, except with regard to the agitator and the injector.

The agitator was formed of two conical frustums arranged on the same vertical axis and connected to a disc at their bases by means of clips; their smaller diameter was 70 mm., their larger diameter was 100 mm., the height of the assembly was 150 mm. and its bottom was located 75 mm. from the bottom of the autoclave; the rotational speed was 800 r.p.m.

The tube for introducing the alkylene oxide terminated in a tubular ring of 120 mm. diameter having ten orifices each of 2 mm. diameter directed towards the bottom of the autoclave. This ring was located at the level of the clips joining the two conical frustums of the agitator.

The process was carried out as described in Example 7, but using 7860 g. of propylene oxide introduced over a period of two hours and fifty minutes.

The polyester obtained, with a yield of 96.3% relative to the propylene oxide, had a molecular mass of 1350.

The resulting polyester resin when tested gave the following results:

Color:
    Red _____ 0.4.
    Yellow _____ 3.
    Blue _____ 0.
Viscosity _____ 5.8 poises.
S.P.I. Test:
    Gel time _____ 4 min., 35 sec.
    Transformation time _____ 7 min., 05 sec.
    Maximum temperature _____ 213° C.

Example 9

In this example an autoclave of 750 mm. diameter and 300 liters capacity was used. It was fitted with:

a double walled casing for the circulation of heating fluid;

a vertical agitator consisting of a four-bladed marine propeller, of 220 mm. diameter located 120 mm. from the bottom of the autoclave and rotating at 400 r.p.m. thus producing a turbulence represented by a Reynolds Number of $4.6 \times 10^4$;

a double walled inverted conical frustum for the circulation of cooling fluid surrounding the agitator and serving the purpose of tube 4 of the reactor of the drawing. The frustum had a height of 370 mm., an upper diameter of 410 mm., a lower diameter of 300 mm. and its bottom end was situated 70 mm. from the bottom of the autoclave;

an alkylene oxide introducer comprising a tube terminating in a tubular ring of 250 mm. diameter, having 50 orifices each of 2 mm. diameter directed towards the bottom of the autoclave. The ring was located in a horizontal plane 30 mm. above the propeller.

The following reactants were introduced into the autoclave:

84 kg. of maleic anhydride
128 kg. of phthalic anhydride
16.4 kg. of ethylene-glycol The mixture was heated to 120° C. while a stream of inert gas was passed therethrough. When the mixture was liquid, it was heated to 140° C., and 103 kg. of propylene oxide was introduced at a flow rate decreasing from 97 kg./hour to 4 kg./hour for 2 hours, then at constant flow at the latter rate for 1 hour 5 mins. During the introduction, cooling was carried out so that the reaction temperature did not exceed 210° C.

A polyester, having a molecular mass 1410 was obtained, with a yield of 97% by weight relative to the propylene oxide.

The polyester was mixed with 175 kg. of styrene containing 42 g. of hydroquinone maintained at 65° C.

The resulting polyester resin when tested gave the following results:

Lovibond Color:
    Red _____ 0.4.
    Yellow _____ 2.
    Blue _____ 0.
Viscosity _____ 6 poises.
S.P.I. Test:
    Gel time _____ 4 min. 05 sec.
    Transformation time _____ 6 min. 20 sec.
    Maximum temperature _____ 212° C.

Example 10

The same autoclave was used as that described in Example 7, except that the agitator comprised two marine propellers each with three blades, of opposite pitch, 115 mm. in diameter and spaced 150 mm. apart. The lower propeller was located 100 mm. from the bottom of the autoclave. The rotational speed was 800 r.p.m.; and the alkylene oxide introducer comprised a tube terminating in a tubular ring located in a horizontal plane equi-spaced between the two propellers. The ring was 120 mm. in diameter and had ten orifices each of 2 mm. diameter directed towards the bottom of the autoclave.

The process was carried out as described in Example 7 using:

9700 g. of maleic anhydride,
6300 g. of phthalic anhydride,
1225 g. of ethylene-glycol, and
7800 g. of propylene oxide, the introduction time being 2 hours 40 minutes.

The polyester obtained, with a yield of 97.5% by weight relative to the propylene oxide, had a molecular mass of 1390.

The resulting polyester resin when tested gave the following results:

Lovibond Color:
    Red _____ 0.3.
    Yellow _____ 3.
    Blue _____ 0.
Viscosity _____ 11 poises.
S.P.I. Test:
    Gel Time _____ 3 min. 45 sec.
    Transformation time _____ 6 min. 20 sec.
    Maximum temperature _____ 210° C.

Example 11

An autoclave of 1800 mm. diameter and 5000 liters effective capacity was used. It was fitted with:

an agitator formed of a three-bladed marine propeller of 500 mm. diameter, surmounted by two helicoidal strips forming three turns of 250 mm. diameter (ribbon-blender-type). The agitator was rotated at 100 r.p.m., creating a turbulence represented by a Reynolds Number of $6 \times 10^4$. The agitator was located along the axis of a fixed, cylindrically coiled tube, for the flow of a cold liquid, of 800 mm. diameter, 1300 mm. height, and located 400 mm. from the bottom of the autoclave; an alkylene oxide introducer comprising a tube terminating in a tubular ring of 550 mm. diameter, having 200 orifices of 2 mm. diameter directed downwards, the ring being located 100 mm. above the marine propeller.

The following reactants were introduced into the autoclave:

1445 kg. of liquid maleic anhydride
2193 kg. of liquid phthalic anhydride, and
272 g. of ethylene-glycol.

A nitrogen atmosphere was created in the autoclave, the liquid mixture was at 145° C. and propylene oxide was introduced at a rate decreasing linearly over 3 hours from 1000 kg./hour to 400 kg./hour. The 1840 kg. of propylene oxide necessary for the reaction was introduced in 2 hours 40 minutes.

After one hour of introduction, the reaction medium temperature was 190° C.; it then rose slowly to 210° C. A stream of nitrogen was passed through the reaction medium to clear it of traces of unreacted propylene oxide.

The polyester obtained, with a yield of 97% relative to the propylene oxide, had a molecular mass of 1380.

The polyester was poured into 2900 kg. of styrene containing 0.68 kg. of hydroquinone, in order that the temperature of the solution should not exceed 70° C.

The resulting polyester resin when tested gave the following results:

Lovibond Color:
    Red _____ 0.2.
    Yellow _____ 2.
    Blue _____ 0.
Viscosity _____ 5.9 poises.
S.P.I. Test:
    Gel time _____ 3 min. 45 sec.
    Transformation time _____ 5 min. 50 sec.
    Maximum temperature _____ 222° C.

Example 12

An autoclave similar to that of Example 11 was used, except that:

The agitator comprised a shaft carrying three discs each of 500 mm. diameter and 10 mm. thickness at spacings of 200 mm. Each disc had 50 contiguous saw teeth machined from the solid. For the upper and lower discs, the machining angle was 45° relative to the plane of the disc, while for the central disc the machining angle was 90°. The lower disc was located 500 mm. from the bottom of the autoclave;

The propylene oxide injector comprised a perforated tubular ring located equi-distant between the central disc and the lower disc.

The following reactants were introduced into the autoclave, which had been previously cleared of the oxygen by nitrogen scavenging:

1764 kg. of liquid maleic anhydride,
1776 kg. of liquid phthalic anhydride,
342 kg. of propylene glycol.

The liquid mixture was at 145° C., and into it was injected propylene oxide at a rate decreasing linearly over 3 hours from 1000 kg./hour to 400 kg./hour. The 1790 kg. of propylene oxide necessary were introduced in 2 hours 45 minutes.

After one hour of introduction of the propylene oxide, the temperature was 190° C. and this temperature was maintained for the remainder of the introduction.

A stream of nitrogen was passed through the reaction mixture to remove unreacted propylene oxide and a polyester, having a molecular mass of 1410, was obtained, with a yield of 97.6% relative to the propylene oxide.

The polyester was then added to 2300 kg. of styrene containing 0.55 kg. of hydroquinone maintained at 65° C.

The resulting polyester resin when tested gave the following results:

Lovibond Color:
    Red _____ 0.2.
    Yellow _____ 1.8.
    Blue _____ 0.
Viscosity _____ 6.8 poises.
S.P.I. Test:
    Gel time _____ 3 min. 30 sec.
    Transformation time _____ 5 min. 30 sec.
    Maximum temperature _____ 220° C.

Example 13

In this example, an autoclave of 280 mm. diameter and 35 liters capacity was used. It was fitted with:

a double walled casing for the circulation of heating fluid;
an agitator formed by a two-bladed marine propeller of 115 mm. diameter rotating at 400 r.p.m. and placed coaxially of a tubular coil for the circulation of cooling liquid; this agitator/coil arrangement was geometrically identical with that of Example 7, the turbine being replaced by the marine propeller;
an external centrifugal pump agitator (motor of 70 mm. diameter and flow rate 1 m.³/hour) which sucked the reaction mixture from the bottom of the autoclave and delivered it at the level of the propeller;
a propylene oxide introducer comprising a tube terminaing in an orifice 2 mm. in diameter and located just in front of the pump delivery outlet.

The process was carried out as described in Example 10, 7900 g. of propylene oxide being introduced over three hours instead of two hours 40 minutes.

The polyester obtained, with a yield of 96% by weight relative to the propylene oxide, had a molecular mass of 1450.

The resulting polyester resin when tested gave the following results:

Lovibond Color:
    Red _____ 0.5.
    Yellow _____ 4.
    Blue _____ 0.
Viscosity _____ 10 poises.
S.P.I. Test:
    Gel time _____ 3 min. 50 secs.
    Transformation time _____ 6 min.
    Maximum temperature _____ 215° C.

Example 14

An autoclave of 530 mm. diameter and 150 liters capacity was used. It was fitted with:

a double walled casing for the circulation of heating and cooling liquids;
an electromagnetic agitator formed of a shaft terminated by a disc of 400 mm. diameter having 200 orifices each of 10 mm. diameter. To this disc there was imparted a longtudinal upward and downward movement of 300 mm. amplitude at a frequency of 40 cycles/minute. At its lower position the disc was 100 mm. from the bottom of the autoclave;
a propylene oxide introducer comprising a tube terminaing in a tubular ring of 450 mm. diameter having 35 orifices each of 1 mm. diameter directed upwards and placed at the bottom of the autoclave.

The following reactants were introduced into the autoclave:

41 kg. of maleic anhydride,
27 kg. of phthalic anhydride,
5.2 kg. of ethylene glycol.

While passing a stream of nitrogen through a mixture, the latter was heated to 120° C. to melt the anhydrides, and then to 140° C. 33.4 kg. of propylene oxide was introduced at a flow rate decreasing from 30 kg./hour to 2 kg./hour over 2 hours, and then at a constant rate for 55 minutes.

The unreacted propylene oxide was removed by a stream of nitrogen. With a yield of 96.1% by weight relative to the propylene oxide, a polyester was obtained having a molecular mass of 1430.

The polyester was mixed into 56 kg. of styrene containing 14 g. of hydroquinone maintained at 65° C.

The resulting polyester resin when tested gave the following results:

Lovibond Color:
    Red _____ 0.4.
    Yellow _____ 3.5.
    Blue _____ 0.
Viscosity _____ 6 poises.
S.P.I. Test:
    Gel time _____ 4 min. 20 sec.
    Transformation time _____ 6 min. 30 sec.
    Maximum temperature _____ 210° C.

Example 15

In this example, an autoclave of 280 mm. diameter and 35 liters effective capacity was used. It was fitted with:

a double walled casing for circulation of heating fluid;
an agitator formed with two marine propellers each with three blades, of opposite pitch, 115 mm. in diameter and spaced 150 mm. apart. The lower propeller was located 100 mm. from the bottom of the autoclave. The rotational speed was 800 r.p.m.
an internal tubular coil for the circulation of cooling fluid, surrounding the agitator, of a generally frusto-conical shape with a height of 170 mm., an upper diameter of 180 mm., a lower diameter of 120 mm. and located 75 mm. above the bottom of the autoclave; and
a tube for introducing the alkylene oxide terminated by a nozzle having a diameter of 2 mm.; located 10 mm. above the agitator blades and directed along a generatrix of the cylinder having the propeller as its base.

Into the autoclave were introduced:

6456 g. of maleic anhydride
9750 g. of phthalic anhydride
1225 g. of ethylene-glycol.

This mixture was heated to 120° C. while a stream of nitrogen was passed therethrough. When the temperature of the mixture reached 140° C., 8360 g. of propylene oxide were introduced for three hours at an exponentially decreasing flow rate. After one hour of introduction, the reaction medium temperature was 200° C., which temperature was maintained for 2 hours 45 minutes.

Unreacted propylene oxide was removed by passing nitrogen through the mixture. A polyester having a molecular mass of 1515, an acid number of 40 and a hydroxyl number of 25 was obtained with a yield of 97.5% relative to the propylene oxide.

The polyester was cooled to 160° C. and was poured into 9000 g. of styrene containing 5.1 g. of hydroquinone maintained at 65° C.

The resulting polyester resin when tested gave the following results:

Lovibond Color:
    Red _____ 0.5.
    Yellow _____ 3.5.
    Blue _____ 0.
Viscosity _____ 22.5 poises.
S.P.I. Test:
    Gel time _____ 4 mins. 0.5 sec.
    Transformation time _____ 6 mins.
    Maximum temperature _____ 190° C.

By way of comparison, a polyester resin was prepared in accordance with a prior art process. The autoclave used was similar, except that the alkylene oxide introduction nozzle was located at the bottom of the autoclave and the latter had a brine-condenser.

Into the autoclave were introduced:

6456 g. of maleic anhydride,
9750 g. of phthalic anhydride,
1225 g. of ethylene glycol.

This mixture was heated to 130° C. while a stream of nitrogen was passed therethrough. 8360 g. of propylene oxide were introduced in 2 hours 45 minutes, while maintaining a mixture temperature of 130° C. The acid number was 86. Then the temperature was raised to 200° C. over a period of 1 hour 30 minutes and held there for three hours.

A polyester having an acid number of 60, a hydroxyl number of 114 and a molecular mass of 575 was obtained.

The same tests as previously described gave the following results:

Lovibond Color:
    Red _____ 0.5.
    Yellow _____ 4.5.
    Blue _____ 0.
Viscosity _____ 16 poises.
S.P.I. Test:
    Gel time _____ 3 mins. 40 sec.
    Transformation time _____ 5 mins. 50 sec.
    Maximum temperature _____ 190° C.

This example showed that:
the reaction time was longer than that taken when using the process of the invention;
the acid number was higher because a part of the propylene oxide had polymerized,
the molecular mass was lower.

It will be understood that changes may be made in the details of formulation and operation without departing from the spirit of the invention, especially as defined in the following claims:

1. In a process for the preparation of copolymerizable unsaturated polyester resins from an alkylene oxide wherein a mixture of an unsaturated dicarboxylic acid anhydride and a chain limiter is agitated in an oxygen free atmosphere and maintained at a temperature within the range of 130° C. to 220° C. and the resulting polyester is mixed with a copolymerizable vinyl group containing monomer in the presence of a polymerization inhibitor, the improvement comprising agitating said mixture to provide a zone of greatest turbulence having a Reynolds number greater than $10^4$, continuously introducing an alkylene oxide into the most turbulent zone of the mixture in an amount within the range of a stoichiometric amount up to a 10% excess, and separating the polyester produced after the addition of the alkylene oxide is completed for admixing with a copolymerizable vinyl group containing monomer.

2. A process as claimed in Claim 1, in which the unsaturated dicarboxylic acid anhydride is selected from the group consisting of maleic anhydride, itaconic anhydride, citraconic anhydride, and mixtures thereof.

3. A process as claimed in Claim 1, in which the rate of introduction of the alkylene oxide is constant and the quantity introduced per hour represents from 25% to 45% of the total quantity to be introduced.

4. A process as claimed in Claim 1, in which the rate of introduction of the alkylene oxide progressively decreases, the quantity introduced per hour initially ranging from 80% to 100% and finally ranging from 2% to 5% of the total quantity to be introduced.

5. A process as claimed in Claim 1, in which the rate of introduction of the alkylene oxide initially decreases and is then constant.

6. A process as claimed in Claim 1, in which the rate or introduction of the alkylene oxide is initially constant and then decreases.

7. A process as claimed in Claim 1, in which the reaction time of the anhydride and the alkylene oxide is within the range of 2 hours 30 minutes to 4 hours 30 minutes.

8. A process as claimed in Claim 1, in which the reaction between the anhydride and the alkylene oxide is carried out under an absolute pressure within the range of 1 to 2 bars.

9. A process as claimed in Claim 1, in which the mixture includes up to 80% moles, with respect to the total quantity of anhydride, of a saturated dicarboxylic acid anhydride.

10. A process as claimed in Claim 9, in which the saturated dicarboxylic acid anhydride is halogenated.

11. A process as claimed in Claim 1, in which the chain limiter is present in an amount within the range of 5% to 30% moles with respect to the anhydride.

12. A process as claimed in Claim 11, in which the chain limiter is present in an amount within the range of 10% to 20% moles with respect to the anhydride.

13. A process as claimed in Claim 1, in which the copolymerizable vinyl group-containing monomer is present in an amount within the range of 20% to 60% by weight with respect to the polyester resin.

14. A process as claimed in Claim 1, in which the polymerization inhibitor is present in an amount within the range of 30 to 200 p.p.m. by weight with respect to the polyester resin.

15. A process as claimed in Claim 1 in which the alkylene oxide is selected from the group consisting of ethylene oxide, epichlorohydrin, propylene oxide and mixtures thereof.

16. In a process for the preparation of copolymerizable unsaturated polyester resins from an alkylene oxide wherein a mixture of an unsaturated dicarboxylic acid anhydride and a chain limiter in an amount within the range of 5 to 30 mole percent based upon the anhydride is agitated in an oxygen free atmosphere and maintained at a temperature within the range of 130° to 220° C. and the polyester produced is mixed with a copolymerizable vinyl group containing monomer in the presence of a polymerization inhibitor, with the copolymerizable vinyl group containing monomer being employed in an amount within the range of 20 to 60% by weight based on the polyester, and the inhibitor being present in an amount within the range of 30 to 300 p.p.m. by weight based upon the polyester, the improvement comprising agitating said mixture to provide a zone of greatest turbulence having a Reynolds number greater than $10^4$, continuously introducing an alkylene oxide into the most turbulent zone of the mixture in an amount within the range of a stoichiometric amount up to a 10% excess, with the pressure being within the range of 1 to 2 absolute bars, and separating the polyester produced after the addition of the alkylene oxide is completed for admixture with the copolymerizable vinyl group containing monomer.

References Cited

UNITED STATES PATENTS 3,374,208   3/1968   Seiner et al. _____ 260—78.4
3,376,273   4/1968   Masters et al. _____ 260—78.4

OTHER REFERENCES

Groggins: "Unit Processes in Organic Synthesis," 5th ed., McGraw-Hill, New York, 1958 (pp. 99–100 and 371).

MELVIN GOLDSTEIN, Primary Examiner

U.S. Cl. X.R.

260—75 M EP, 75 VA